(12) United States Patent
Legleiter et al.

(10) Patent No.: US 6,924,328 B2
(45) Date of Patent: Aug. 2, 2005

(54) STABILIZED COATING COMPOSITIONS

(75) Inventors: Jason M. Legleiter, Jefferson Hills, PA (US); Robert M. O'Brien, Monongahela, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 89 days.

(21) Appl. No.: 10/224,120

(22) Filed: Aug. 20, 2002

(65) Prior Publication Data

US 2003/0069334 A1 Apr. 10, 2003

Related U.S. Application Data

(60) Provisional application No. 60/317,705, filed on Sep. 6, 2001, and provisional application No. 60/317,734, filed on Sep. 6, 2001.

(51) Int. Cl.$^7$ .............................. C08K 5/01; C08L 27/04; C08L 27/06; C08L 27/16
(52) U.S. Cl. ..................... 523/454; 523/434; 523/451; 523/455; 525/108; 525/109; 525/111; 525/121
(58) Field of Search ............................ 523/456; 525/121

(56) References Cited

U.S. PATENT DOCUMENTS

| | | | | |
|---|---|---|---|---|
| 3,513,115 A | * | 5/1970 | Tryzna et al. ............... | 523/100 |
| 3,941,908 A | * | 3/1976 | Valia et al. ................. | 428/379 |
| 3,943,082 A | | 3/1976 | Smith et al. ................. | 427/27 |
| 4,496,692 A | | 1/1985 | Riew et al. .................. | 525/65 |
| 4,778,851 A | | 10/1988 | Henton et al. ................ | 525/65 |
| 4,970,127 A | | 11/1990 | Smith et al. ................. | 428/694 |
| 5,055,522 A | * | 10/1991 | Ikeda et al. ................. | 525/124 |
| 5,082,698 A | | 1/1992 | Anderson et al. ............. | 427/386 |
| 5,514,433 A | * | 5/1996 | Cole ........................... | 428/35.8 |
| 5,641,818 A | | 6/1997 | Sweet ......................... | 523/404 |
| 5,776,569 A | | 7/1998 | Cole ........................... | 428/35.8 |
| 5,891,960 A | | 4/1999 | Claar et al. ................. | 525/162 |
| 5,969,015 A | * | 10/1999 | Zinke et al. ................. | 424/109 |
| 6,084,036 A | | 7/2000 | Carney et al. ................ | 525/454 |
| 6,124,401 A | | 9/2000 | Hart, Jr. et al. ............. | 525/108 |
| 6,235,102 B1 | | 5/2001 | Parekh et al. ................ | 106/287.22 |
| 6,525,112 B1 | * | 2/2003 | Bammel ....................... | 523/404 |

FOREIGN PATENT DOCUMENTS

| | | | | |
|---|---|---|---|---|
| DE | 2149460 A | * | 4/1973 | ........... C08F/29/18 |
| EP | 0 291 260 A2 | | 11/1988 | |
| EP | 0 449 359 A2 | | 10/1991 | |
| EP | 0 565 206 A2 | | 10/1993 | |
| EP | 0 576 756 A1 | | 1/1994 | |
| JP | 6-192523 | | 7/1994 | |
| JP | 08127693 A | * | 5/1996 | ........... C08L/27/06 |

OTHER PUBLICATIONS

Infochem.com Trade name information bulletin for Paraplex G–25, 2000–2004.*

Dick et al., "Solid State $^{13}$C and In–Situ $^1$11 NMR Investigation of Char Formation in PVC and Polychloroprene Degradation," *Polymeric Materials: Science and Engineering*, vol. 83, Fall Meeting, Aug. 20–24, 2000, Washington, D.C. p. 96.

Odian, *Principles of Polymerization*, Third Edition, 1991, John Wiley & Sons, Inc., New York, Chapter 2, pp. 108–119.

Starnes et al., "Poly(Vinyl Chloride) Degradation: Recent Mechanistic Investigations," *Polymer Preprints*, 2001, 42(1):404–405.

* cited by examiner

*Primary Examiner*—Robert Sellers
(74) *Attorney, Agent, or Firm*—Shumaker & Sieffer

(57) ABSTRACT

A coating composition includes a thermoplastic dispersion and a stabilizer. The stabilizer includes the reaction product of an epoxy resin and an acid, wherein the stabilizer has at least two oxirane functional groups per molecule.

37 Claims, No Drawings

STABILIZED COATING COMPOSITIONS

RELATED APPLICATIONS

This application claims priority from U.S. Provisional Application Ser. No. 60/317,705 filed Sep. 6, 2001 and 60/317,734 filed on Sep. 6, 2001.

This application is related to an application filed on even date, having Ser. No. 10/224,183, which is hereby incorporated by reference.

TECHNICAL FIELD

This invention relates to coating compositions useful, for example, in packaging applications, and more particularly to stabilized coating compositions that are substantially free or free of epoxy novolacs.

BACKGROUND

Conventional container coatings may be derived from a thermally curable formulation that includes particles of a thermoplastic material, typically vinyl chloride polymers (e.g., polyvinylchloride (PVC)), in an organic solvent. When these coatings are applied to a substrate and cured, the thermoplastic can degrade and discolor. To stabilize the thermoplastic material (i.e., reduce degradation) during the curing process, epoxy resins such as, for example, polyglycidyl ethers of cyclic polyols like bisphenol A (often referred to as "BADGE") and epoxy novolacs, may be added to the coating formulation.

To reduce potential contamination of the packaged articles, it is desirable to reduce the extractable content of epoxy novolacs and other epoxy compounds in the coatings applied to food and beverage containers. Epoxy compounds with high epoxy equivalent weights may be used to reduce extractable epoxy content in the coating. However, if standard epoxies with equivalent weights higher than that of epoxy novolac (e.g., about 178) are incorporated in compositions at an effective level, coating performance is compromised, particularly adhesion. In addition, the hydroxyl functional groups in these high molecular weight compounds may react with additives such as secondary film formers (e.g., urea-formaldehyde resins, acrylics, and phenolics) in the coating formulation. This reaction increases crosslinking, which may decrease the adhesion and flexibility of the coating, thus limiting the use of the coating to only certain types of containers and applications. For example, a cured coating that is too brittle (e.g., from too much crosslinking) would be inappropriate for use in deeply drawn metal containers, which require sufficient coating flexibility to bend and form.

What is desired, yet not available in current coatings, is a stabilized coating composition that is sufficiently flexible, has high adhesion to metal, and is substantially free or free of epoxy novolacs.

SUMMARY

In one embodiment, the present invention provides a coating composition including a dispersion of a thermoplastic in a liquid carrier and a stabilizer. The stabilizer in this embodiment preferably is a reaction product of an epoxy resin and an acid, and includes at least two oxirane functional groups per molecule.

In another aspect, the invention provides a method of making a coating composition including: (i) providing a thermoplastic dispersion; (ii) providing a stabilizer including the reaction product of an epoxy resin and an acid, wherein the stabilizer has at least two oxirane functional groups per molecule; and (iii) admixing the stabilizer and dispersion.

In another aspect, the invention provides a method of coating a substrate. The method includes: (i) providing a coating composition including a thermoplastic dispersion, and a stabilizer including the reaction product of an epoxy resin and an acid, wherein the stabilizer has at least two oxirane functional groups per molecule; (ii) applying the coating composition onto at least one surface of the substrate; and (iii) curing the coating composition.

In still another aspect, the invention provides substrates having a cured coating of the present invention adhered thereto.

In preferred embodiments of the present invention, a reaction product of an epoxy resin and an acid, particularly a multi-functional acid, provides an effective stabilizer for use in preferred coating compositions. While not intending to be bound by theory, the stabilizers are believed to protect against thermal degradation of the thermoplastic components of the coating compositions during cure. These preferred coating compositions contain substantially no or no epoxy novolacs, yet are sufficiently adherent and flexible for use on metal substrates, including deeply drawn containers. The reduced epoxy content in the coating composition minimizes contamination of the packaged articles.

DEFINITIONS

As used herein and in the claims, the following terms have the meanings as set forth:

"Epoxy equivalent weight" is defined as the number of grams of resin containing one chemical equivalent of epoxy group.

"multi-functional acid" is an acid having 2 or more carboxyl functional groups.

"Curing" is the process of coalescing and fusing of the thermoplastic material particles in the composition.

"Substantially epoxy-novolac-free" means that the compositions of the present invention are contaminated with, or liberate as a result of curing, no more than about 1 percent by weight epoxy novolac.

"Essentially epoxy-novolac-free" means that the compositions of the present invention are contaminated with, or liberate as a result of curing, no more than about 0.5 percent by weight epoxy novolac.

"Essentially completely epoxy-novolac-free" means that the compositions of the present invention are contaminated with, or liberate as a result of curing, no more than about 0.25 percent by weight epoxy novolac.

"Completely epoxy-novolac-free" means that the compositions of the present invention are contaminated with, or liberate as a result of curing, less than 5 parts per million (ppm) epoxy novolac.

DETAILED DESCRIPTION OF THE PREFERRED EMBODIMENTS

Preferred coating compositions of the present invention include a dispersion of a thermoplastic material in a liquid carrier, and a stabilizer. Preferred compositions are substantially free or completely free of epoxy novolacs.

A suitable stabilizer for use in preferred inventive coating compositions is a reaction product of an epoxy resin and an acid, and has at least two oxirane functional groups per molecule. More preferably, the epoxy functional stabilizer includes at least 3 oxirane functional groups per molecule.

The term "epoxy resin," as used herein, refers to a thermosetting polymeric material that includes either pendant and/or terminal oxirane groups. Preferably, the epoxy resins useful for the stabilizer of the present invention have a number average molecular weight of about 222 to about 1500, which corresponds to an epoxy equivalent weight of about 111 to about 750. More preferably, the epoxy resins have an average number molecular weight of about 300 to 400, corresponding to an epoxy equivalent weight of about 150 to about 200. Most preferably, the epoxy resin has an average number molecular weight of about 340 to about 380, corresponding to an epoxy equivalent weight of about 170 to about 190.

In one embodiment of the invention, the epoxy resin is made by reacting an epoxide with a diglycidyl ether of a dihydroxy compound selected from bisphenol A, bisphenol F, biphenol, resorcinol and the like. A particularly suitable dihydroxy compound is made from bisphenol-A. Commercially available epoxy resins suitable for the present invention include those available under the trade designations EPON 828, 836 and 1001, available from Resolution Performance Products (Houston, Tex.) (formerly Shell Chemical Co., Houston Tex.) liquid epoxies DER 331, 383, and 661 available from Dow Chemical (Midland, Mich.), ARALDITE 502, 506, 507, 508 and GY2600, available from Vantico (Zurich, Switzerland), YD 128, 134, 011, and 012 and KD 292G, available from Kukdo (Seoul, South Korea), and NPEL 120, 127, 128, and 134, NPES 901 and 902, available from Nan Ya (Taipei, Taiwan).

Suitable acids (for reaction with the epoxy resin to make the stabilizer) can be selected based on its molecular weight and the extent of its functionality. A multifunctional acid is preferred to maximize the epoxy functionality of the resulting stabilizer. Acids having good solubility in the solvent used for the reaction are also preferred. Suitable acids for use in acting with the epoxy resin are those that have at least two carboxyl functional groups. Examples of suitable acids include citric, adipic, phthalic, isophtalic, terephthalic, succinic, glutaric, benzene-tricarboxylic, oxalic, malonic, pimelic, suberic, azelaic, sebacic, trimellitic, and trimesic acids.

To produce the epoxy functional stabilizer for the compositions of the invention, the reaction between the epoxy resin and the acid can be conducted at a ratio such that the final composition will minimize any excess of epoxy. It is also desirable that premature gellation does not occur during synthesis of the stabilizer. The ratio of resin to acid to be used is dependent on the functionality of the acid and the functionality of the epoxy. Premature gellation can be prevented by maintaining a mole ratio of the reactants at an extent of reaction needed for gellation, $P_c$, of greater than about 1.0. The extent of reaction needed for gellation can be determined using Flory's equation. (See "Principles of Polymerization," George Odian, $3^{rd}$ Ed., (1991) Chapter 2, pp. 108–119). In the case of acids having bi-functionality, a ratio of at least about two equivalents epoxy to one equivalent acid is preferred. Examples of molar ratios for a $P_c$ of 1.01 using epoxies and acids of various functionalities are given below:

| Epoxy Functionality | Acid Functionality | Mole Ratio Epoxy/Acid | Mole Ratio Acid/epoxy |
| --- | --- | --- | --- |
| 2 | 2 | 1.02 | 0.98 |
| 2 | 3 | 3.06 | 0.37 |
| 2 | 4 | 6.10 | 0.16 |
| 3 | 2 | 0.68 | 1.47 |
| 4 | 2 | 0.51 | 1.96 |
| 5 | 3 | 2.04 | 0.49 |

The stabilizer can be prepared, for example, by admixing the epoxy resin and the acid in a solvent and heating to a temperature of about 100 to about 150° C. For small batches, the stabilizer can be prepared on the bench or in a laboratory using generally known lab equipment that would include a suitable round bottom flask equipped with a stirrer, condenser, Nitrogen inlet, thermocouple and heating mantle. In one preferred method of preparing the stabilizer, the epoxy resin and acid are added at the appropriate ratio with solvent and catalyst. Nitrogen is started, as well as stirring and heating. The mixture preferably is heated to about 130° C. As the temperature increases, the acid melts and the solution generally becomes clear. In some instances, as the reaction progresses, the solution may darken. Once at temperature, the progress of the reaction can be monitored by epoxy equivalent weight using a potentiometric automatic titrator as described in ASTM D1652-97. When the reaction is complete, it is useful to allow the solution to cool before evaluating and using the composition. For larger, production size batches, preparation of the stabilizer can be performed in a suitable vessel (e.g., a stainless steel vessel with heating and cooling capability, and equipped with an agitator, a condenser, and inert gas inlet). A process similar to that just recited for small batches can then be followed.

As used herein, "thermoplastic dispersion" is a composition having particles of thermoplastic material dispersed in a liquid carrier. Suitable liquid carriers can be an organic solvent, a plasticizer, or a combination of the two. Suitable liquid carriers include, for example, polar solvents such as ketones (e.g., MIBK and DIBK), glycol ethers, alcohols, aliphatic hydrocarbons, aromatic hydrocarbons, or combinations thereof. It is advantageous to choose a solvent that has an affinity to the thermoplastic material and/or one that can swell the thermoplastic particles to help increase viscosity. Furthermore, preferred carriers have sufficient volatility to substantially evaporate from the coating composition during the curing process.

When the liquid carrier comprises an organic solvent or a combination of an organic solvent and a plasticizer, it may be referred to as an "organosol." Organosols useful in the compositions of the invention, include, for example, vinyl organosols. A "vinyl organosol", as used herein, is a dispersion of vinyl chloride polymers (preferably high molecular weight vinyl chloride polymers) in a liquid carrier. Suitable vinyl chloride polymers can have a molecular weight of about 50,000 to about 300,000; preferably between about 75,000 to about 200,000; more preferably between about 100,000 to about 150,000.

"Plastisols" are dispersions that have the thermoplastic particles dispersed in a plasticizer. Examples of suitable plasticizers include phthalates, phosphates, adipates, sebacates, epoxidized oils, polyesters, and combinations thereof.

Suitable thermoplastic materials are halogenated polyolefins, which include, for example, the copolymers and homopolymers of vinyl chloride, vinylidenefluoride and its copolymers and homopolymers, polychloroprene, polychloroisoprene, polychlorobutylene, and combinations thereof. In a preferred aspect of the invention, polyvinylchloride (PVC) is a suitable thermoplastic material.

In applications involving packaging coatings, dispersion grade particles are preferred, where the particles range from about 0 to about 5 microns. Other sizes, however, can be used, such as non-dispersion grade particles that range from about 5 to 100 microns.

The coating compositions of the invention may optionally include other additives and agents. Suitable additives include, for example, those that further improve the processability or manufacturability of the composition, enhance composition aesthetics, or to improve a particular functional property or characteristic of the coating composition or the cured composition resulting therefrom, such as adhesion to a substrate. Additives that may be included are carriers, emulsifiers, pigments, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers or combinations thereof. Each optional ingredient can be included in a sufficient amount to serve its intended purpose, but not in such an amount to adversely affect a coating composition or a cured coating composition resulting therefrom.

In addition, the coating composition may also include one or more secondary film forming compounds that are integrally associated with the thermoplastic material particles. Suitable secondary film forming compounds include, for example, acrylic resins and benzo guanamines, phenolics, melamine formaldehyde, and other urea formaldehyde resins. The coating composition may also include one or more acid catalysts for curing the secondary film forming compounds. Suitable acid catalysts include phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), and alkyl acid phosphate (AAP).

Plasticizers can also be incorporated in the dispersion. Additional organic solvents can be added as diluents (e.g., aromatic solvents) to alter the application characteristics and adjust viscosity and fluidity for ease of processing and application.

Preparation of thermoplastic dispersion can be performed by any known methods of mixing or blending components that provides high speed mixing for sufficient suspension and dispersion of the particles. Process methods that can be used include, for example, solution blending, high speed dispersion, high speed milling, and the like. Substantially homogeneous dispersion of the particles throughout the liquid carrier would indicate an adequate mixture or blend. The thermoplastic particles remain substantially undissolved in the liquid carrier.

To prepare the coating compositions of the invention, the dispersion is generally made in a first step (a dispersion phase) where the composition is thickened and has somewhat higher solids than the subsequent phase, often referred to as the "let down" where the components (e.g. addition of the stabilizer) are stirred at a slower rate. Process methods to make the coating compositions of the invention include admixture, blending, paddle stir, and other similar mixing processes. The mixture is mixed and agitated until all the composition ingredients are homogeneously dispersed throughout the liquid carrier.

The coating composition of the invention can comprise about 5% to about 10% stabilizer, by weight of nonvolatile material.

The coating composition can be applied to a substrate using procedures known in the art, including spray coating, roll coating, coil coating, curtain coating, immersion coating, meniscus coating, kiss coating, blade coating, knife coating, dip coating, slot coating, slide coating, and the like, as well as other types of premetered coating. In an aspect where the coating is used to coat metal sheets or coils, the coating can be applied by roll coating.

After applying the coating composition onto a substrate, the composition can be cured using a variety of processes, including, for example, oven baking by either conventional or convectional methods, or any other method that provides an elevated temperature that allows the thermoplastic material particles to fuse together. The curing process may be performed in either discrete or combined steps. For example, substrates can be dried at ambient temperature to leave the coating compositions in a largely un-fused state. The coated substrates can then be heated to fully cure the compositions. In certain instances, coating compositions of the invention can be dried and heated in one step.

The curing process may be performed at temperatures in the range of about 350° F. (177° C.) to about 450° F. (232° C.), taking into account, however that the upper end of the temperature range can change, depending on the decomposition temperature of the thermoplastic material. PVC, for example, begins to degrade at about 370° F., while other materials may degrade at higher temperatures. In the situations where PVC is used and the substrate coated is in metal sheet form, curing can be performed at about 350° F. (177° C.) to about 400° F. (205° C.) for about 5 to about 15 minutes. Where the coating compositions are applied on metal coils, curing is typically conducted at temperatures of about 420° F. (210° C.) to 450° F. (232° C.) for about 5–30 seconds.

The cured coatings of the invention are particularly well suited as coatings for metal cans or containers, although many other types of substrates or packaging materials can be coated. Substrates may be coated with at least one layer of the coating then cured before the substrate is formed and shaped. Where metal cans or containers are formed, the coating may be present on the inside of the containers, the outside of the containers, and/or the ends of the containers. The cured coatings of the invention adhere well to metal and provide substrates with high levels of resistance to corrosion or degradation that may be caused by food or beverage products.

EXAMPLES

The following examples are merely for illustrative purposes only and are not meant to limit the scope of the appended claims. All parts, percentages, ratios, etc. in the example and the balance of the written description are by weight unless otherwise indicated.

Test Methods

Corrosion Evaluation

Samples are evaluated from about arm's length distance with an unaided eye. Blisters and/or reddish rust are indications of corrosion. A number between 0 and 10 (inclusive) is given to "rate" the amount of corrosion observed. A rating of "3" would indicate 30% of the coating was un-corroded, a rating of 7 would indicate 70% remained un-corroded, etc.

Surface Stain Evaluation

Samples are evaluated from about arm's length distance with an unaided eye to look for discoloration of the coating. A number between 0 and 10 (inclusive) is given to "rate" the amount of staining observed. A rating of "3" would indicate 30% of the coating was un-stained, a rating of 7 would indicate 70% was unstained, etc. For fish foodpack tests, the following criteria is followed: for salmon, a pinkish to reddish color indicates staining; for tuna, a brownish to blackish color indicates staining.

Blush Evaluation

Samples are evaluated from about arm's length distance with an unaided eye. A number between 0 and 10 (inclusive) is given to "rate" the amount of blushing observed. A rating of "3" would indicate 30% of the coating was un-blushed, a rating of 7 would indicate 70% was un-blushed, etc.

Adhesion Test

Beaded cans drawn to 54 mm×51 mm are made using a commercial can press (E.W. Bliss Co.; Hastings, Mich.). Cans are washed in detergent solution (1 oz. liquid detergent to 1 gallon of tap water) then rinsed with clean water. The coated surface is then cross-hatched with a scribe by making four parallel lines, approximately two tenths inch apart and approximately one and one half inches long, intersected at 90 degrees with four additional lines similarly spaced. A strip of Scotch Cellophane Tape (1" wide, Product #610; Minnesota Mining and Manufacturing Co., (3M), Maplewood, Minn.) approximately three inches long is pressed diagonally across the scribed squares. The tape is pressed down firmly with the finger. The tape is then removed with a quick pull from the panel. The removal of the tape should be a peeling back motion rather than a direct lifting motion, where the angle of pull should be approximately 150°.

Adhesion is rated on the basis of how much of the coating in the scribed squares is removed. No coating removal is rated 10 (no failure), and complete removal of the coating is rated 0, as (i.e., complete failure). Intermediate ratings are estimated as the percentage of coating which has not been removed, for example, if 80% of the coating remains, the sample is given a rating of "8"; and a rating of "3" would indicate that 30% of the cured coating remained adhered to the substrate.

Epoxy Equivalent Weight

ASTM D 1652-97 was used to determine the epoxy equivalent weight.

Method for the Determination of BFDGE, and Chlorinated and Hydrolyzed Species of BFDGE in Coatings Using Acetonitrile Extraction and Detection with HPLC-Fluorescence This method describes the preparation of metal coated substrates for the analysis of BFDGE, by liquid chromatography with Fluorescence detection. This method allows a detection limit of about 0.80 $\mu g/dm^2$. The reported detection limit is 2 $\mu g/dm^2$.

The level of free bisphenol-F-diglycidylether (BFDGE) in a coating sample is measured after extraction of the coating with Acetonitrile. The extract is analyzed by means of HPLC (High Performance Liquid Chromatography) using Fluorescence detection.

The reagents used in this procedure include:
Bisphenol-F-diglycidylether (BFDGE)—purity>95%
Acetonitrile (HPLC grade)
Tetrahydrofuran (HPLC grade)
Distilled Water The apparatus used for the procedure include:
an analytical balance capable of weighting to the 0.10 mg;
various laboratory glassware including volumetric flasks, graduated cylinders, beakers, and pipettes
an HPLC system that includes: a binary pump system, a fluorescence detector, an analytical column and guard column, and a data collection system (PE Nelson Turbochrome).

The conditions under which the procedure is performed are as follows:
Analytical columns: 2 Supelcosil LC-18 (25 cm×4.6 mm); 5 micron particle size in series
Eluent: 99% of (50%—50% Acetonitrile/water) and 1% of Tetrahydofuran held for 10 minutes then over 35 minutes change to 85% of the 50/50 Mix and 15% of Tetrahydofuran and hold for 5 minutes. Then over 2 minutes change to 100% Tetrahydrofuran and hold for 10 minutes. (The change to 100% THF allows for residual BFDGE to be pushed off the column, before beginning the analysis again
Flow Rate is maintained at 0.75 ml/min
Injection Volume: 115 microliters
Detection: Fluorescence (scanning) with excitation at 275 nm and emission at 300 nm To prepare the Stock standard solution, 0.01 g of BFDGE is weighed and brought up to volume in a 100 mL volumetric flask with Acetonitrile.

To prepare the working standard solution, in the appropriate size volumetric flasks, make serial dilutions with acetonitrile to the working range of the detector.

Sample Preparation and Analysis

This procedure is most useful with panels of epoxy coated metal having uniform coating. The edges of coated substrates are generally discarded since the coating may not be homogenous.

To prepare a panel, 2.5 $dm^2$ (40 $in^2$) of panel are cut into 1 cm×2 cm pieces. These pieces are placed into a 200 mL Erlenmeyer flask and 1 mL of acetonitrile is added. The sample is allowed to stand covered at ambient temperature for 24 hours.

The acetonitrile extract is filtered through a paper filter into a 250 ml iodine flask and then capped with a flask stopper.

The sample and standards are further filtered through a 0.2 micron PFTE filter. 50 microliters of the sample or standard is injected into the HPLC system. The BFDGE area counts are measured using the Turbochrome data system. BFDGE is identified on the basis of its retention time.

Calibration and Calculation

Calibration: The peak area for each of the standard solutions is used to construct a calibration curve. The relative standard deviation should be ten percent or less. The correlation coefficient should be 0.995 or higher.

Calculation: The amount of BFDGE present in the sample was found by using the following equation:

$$\mu g/dm^2 = \frac{(\text{Area count} \times \text{Response factor}) \times V}{A}$$

where V=volume of acetonitrile used in extraction (ml)
A=area of panel extracted ($dm^2$)

| Table of Abbreviations | | |
|---|---|---|
| Trade Designation, Abbreviation, or Name | Source (City, State) | Description |
| Butyl CELLOSOLVE | Eastman (Kingsport, TN) | Ethylene glycol butyl ether |
| MIBK | Union Carbide (Institute, WV) | Methyl isobutyl ketone |
| DMBA | | Dimethyl benzylamine |

-continued

Table of Abbreviations

| Trade Designation, Abbreviation, or Name | Source (City, State) | Description |
|---|---|---|
| VMCH | Union Carbide (Texas City, TX) | Solution vinyl |
| Cymel 5010 | Cytec Industries (Wellingford, CT) | Benzoguanamine formaldehyde resin |
| SL-404 | Elementis (Jersey City, NJ) | Polymeric wax dispersion |
| DEN 438 | Dow Chemical (Texas City, TX) | Epoxy novolac |
| EPON 828 | Dow Chemical (Texas City, TX) | |
| Toluene | ExxonMobil (Houston, TX) | |
| Isophorone | Creanova (Parsippany, NJ) | |
| Phosphoric Acid 85% | Astaris (St. Louis, MO) | |
| Carnauba Wax Dispersion | Michelman (Cincinnati, OH) | |
| Aluminum Pigment Paste | Silberline (Tamaqua, PA) | |

Preparatory Example 1

Stabilizer (Pc=1.01)

A four neck flask was equipped with a stirrer, condenser, thermocouple and Nitrogen inlet. Added to this flask was 153.65 g of EPON 828 (Epoxy Equivalent Weight 186.9), 12.91 g Citric Acid, 55.5 g Methyl Isobutyl Ketone (MIBK) and 0.34 g Dimethyl Benzyl Amine (DMBA). The temperature was increased to 130° C. The solution cleared and slowly developed a dark color. The progress of the reaction was monitored by epoxy equivalent weight, using ASTM D 1652-97. Once the desired epoxy equivalent weight was obtained, the solution was cooled. This produced a composition having a very dark color, with 75.6% solids, a final epoxy equivalent weight of 288, and an acid number of 3.6 (determined by potentiometric titration).

Preparatory Example 2

Stabilizer (Pc=1.05)

Following the same procedure as described in Preparatory Example 1, to an appropriate flask, 488.0 g of EPON 828, 38.0 g Citric Acid, 177.0 g MIBK and 1.05 g DMBA were added. This produced a composition having a very dark color, with 75.0% solids, a final epoxy equivalent weight of 287, and an acid number of 0.54 (determined by potentiometric titration).

Preparatory Example 3

Stabilizer Using Adipic Acid

Following the same procedure as described in Preparatory Example 1, to an appropriate flask, 261.7 g of EPON 828, 51.1 g Adipic Acid, 104.2 g MIBK and 0.6 g DMBA were added. This produced a composition having a very dark color, with 75.0% solids, a final epoxy equivalent weight of 515, and an acid number of 0.1 (determined by potentiometric titration).

Example 4

The stabilizer of Preparatory Example 1 was incorporated into an organosol. This was done by the following procedure. (The stabilizer was substituted for novolac on the basis of equivalents oxirane.)

The toluene, isophorone, MIBK, and butyl CELLOSOLVE were added to a stainless steel mixing vessel. To this vessel, VMCH was added with low speed mixing. The mixture was stirred for 30 minutes maintaining a temperature of 30° C. to 44° C. After 30 minutes, the mixture was cooled to below 38° C. and the Cymel 5010, the PVC Dispersion, and SL-404 were added with agitation. In a separate stainless steel mixing vessel, the aluminum pigment, isophorone, and resin from Preparatory Example 1 were slow stirred for 30 minutes. This aluminum slurry was then added to the original mixing vessel and slow stirred for 30 minutes. Finally, the carnauba wax dispersion, butanol, phosphoric acid, toluene, and isophorone were added to the mixing vessel and the complete coating composition was stirred for 15 minutes. Table 1 provides the final composition.

TABLE 1

| Component | Percent Weight |
|---|---|
| Toluene | 21.07 |
| Isophorone | 12.29 |
| MIBK | 9.47 |
| Butyl Cellosolve | 0.01 |
| VMCH | 8.66 |
| Cymel 5010 | 5.75 |
| PVC Dispersion* | 29.86 |
| SL-404 | 1.15 |
| Aluminum Pigment Paste | 5.01 |
| Citric Acid Stabilizer | 3.14 |
| Carnauba Wax Dispersion | 1.17 |
| N-Butanol | 2.18 |
| Phosphoric Acid 85% | 0.25 |

*The PVC Dispersion contains dispersion grade PVC particles (GEON 178 available from Polyone; Point Henry, IN) in an organic solvent (AROMATIC 100 available from ExxonMobil; Houston, TX) and a plasticizer (PARAPLEX G25 available from C. P. Hall; Chicago, IL)

Comparative Example 5

Using the same procedure as in Example 4, a similar composition was prepared except that the stabilizer was substituted with epoxy novolac. Table 2 provides the final composition.

TABLE 2

| Component | Percent Weight |
|---|---|
| Toluene | 21.32 |
| Isophorone | 12.44 |
| MIBK | 9.58 |
| Butyl Cellosolve | 0.01 |
| VMCH | 8.76 |
| Cymel 5010 | 5.82 |
| PVC Dispersion | 30.22 |
| SL-404 | 1.17 |
| Aluminum Pigment Paste | 5.07 |
| Epoxy Novolac Solution | 1.97 |
| Carnauba Wax Dispersion | 1.18 |
| N-Butanol | 2.21 |
| Phosphoric Acid 85% | 0.25 |

Determination of BFDGE

Using the method described above for determining the amount of BFDGE, samples from Example 4 and Comparative Example 5 were analyzed.

Comparative Example 5 resulted in an amount of BFDGE equal to 145 µg/dm². Example 4, the composition having no novolac but was stabilized with a stabilizer resulted in a "non-detectable" value for BFDGE.

Adhesion Testing

The coating compositions of Example 4 and Comparative Example 5 were evaluated by applying the composition to tin-free steel (TFS) and baking for 20 seconds to a peak metal temperature of 232° C. (AER Coil Oven; AER Corp.; Ramsey, N.J.). The cured coating compositions were tested at a dry film weight of 1.2 mgs/cm$^2$ to 1.6 mgs/cm$^2$.

Steel coated with compositions from Example 4 and Comparative Example 5 were drawn into 3 each, 54 mm×51 mm, beaded cans using a can press (E.W. Bliss Co.; Hastings, Mich.). These cans were then tested for coating adhesion on the upper sidewall, middle sidewall, and lower sidewall, using the test method set forth in the Test Methods above. The drawn can adhesion properties of the cured coating compositions are summarized in Table 3.

TABLE 3

| Adhesion | Example 4 | Comparative Example 5 |
| --- | --- | --- |
| Bead | 9 | 9 |
| Upper Sidewall | 10 | 10 |
| Middle Sidewall | 10 | 9 |
| Lower Sidewall | 10 | 10 |

Examples 6–8

Thermal Degradation Testing

A composition (Comparative Example 6) was made by adding an epoxy novolac (DEN 438) to 50.0 g of PVC Dispersion. The epoxy novolac was added at a level known to stabilize PVC.

To prepare Example 7, stabilizer from Preparatory Example 1 was added to 50.0 g of PVC dispersion. The amount of stabilizer used in the formulation was determined such that there was an equivalent 1:1 oxirane substitution. The amount of stabilizer added compensated for the difference in non-volatile mass between DEN 438 and the stabilizer.

A "control example" (Comparative Example 8) was also made, and contained neither novolac nor stabilizer.

TABLE 4

| | (in grams) | | |
| --- | --- | --- | --- |
| | Comparative Example 6 | Example 7 | Comparative Example 8 |
| PVC Dispersion | 50.0 | 50.0 | 50.0 |
| Epoxy novolac (DEN 438) | 3.33 | 0 | 0 |
| Citric Acid Stabilizer | 0 | 8.08 | 0 |

Examples 6, 7 and 8 were then tested for their ability to stabilize PVC from thermal degradation.

Samples from each composition were applied to tinplate and baked 1 minute to a peak metal temperature of 232° C. in a conventional force draft oven (Precision Scientific Oven; Precision Scientific, Chicago, Ill.). The metal was scratched with steel wool prior to baking to expose the iron under the tin treatment. This was done because iron catalyzes the degradation of PVC, thus testing the stabilizer in a "worst case scenario." After baking, the panels were evaluated as to the extent of burned PVC.

The sample without any stabilizer or epoxy novolac (Comparative Example 8) was completely burned and charred. It appeared as ash particles floating around in the oven. Both Comparative Example 6 and Example 7 turned gold in color with no evident charring of the PVC.

Example 9

Albacore White Tuna in Water

Three beaded cans (54 mm×51 mm) were fabricated from tin-free steel coated with the coating formulations in Examples 4 and Comparative Example 5. These cans were then cold filled with albacore white tuna in water, double seamed, and processed (i.e pressure cooked) for 90 minutes at 122° C. at 15 psi, using a stainless steel pressurized kettle (Innova Process Kettles; Pressure Cooker Model 42010 from Innovation Group Ltd.; Bettendorf, Iowa). The cans were then quenched with water, opened, and evaluated. See Table 5 below.

Example 10

Red Sockeye Salmon in Oil

Three beaded cans (54 mm×51 mm) were drawn from tin-free steel coated with the coating formulations in Examples 4 and Comparative Example 5. The cans were then cold filled with red sockeye salmon packed in oil, double seamed, and processed (i.e., pressure cooked) for 60 minutes at 126° C. at 15 psi, using a process kettle (Electric Pressure Steam Sterilizer; Wisconsin Aluminum Foundry Co.; Minitowoc, Wis.). The cans were cooled to room temperature and stored for 1 week at 50° C. After one week, the cans were opened and evaluated. See results in Table 5 below.

All 6 cans packed with fish products were evaluated for adhesion, surface stain, blush, and corrosion, per the tests recited above. The results of the food packs are summarized in Table 5.

TABLE 5

| | Example 4 coating | Comparative Example 5 coating |
| --- | --- | --- |
| Example 9: Albacore Tuna in Water Adhesion | | |
| Bead | 9 | 10 |
| Upper sidewall | 10 | 10 |
| Middle sidewall | 10 | 10 |
| Lower sidewall | 10 | 8 |
| Blush | 9 | 9 |
| Surface Stain | 10 | 10 |
| Corrosion | 10 | 10 |
| Example 10: Red Sockeye Salmon in Oil Adhesion | | |
| Bead | 10 | 9 |
| Upper sidewall | 10 | 10 |
| Middle sidewall | 10 | 10 |
| Lower sidewall | 10 | 10 |
| Blush | 10 | 10 |
| Surface Stain | 9 | 9 |
| Corrosion | 9 | 10 |

Example 11

Preparation of Coating Compositions with Reduced Amount of Stabilizer from Preparatory Example 2

Coating compositions were made that contained a 40% reduction in the amount of stabilizer resin as compared to the amount used in the previous examples. The stabilizer of Preparatory Example 2 was incorporated into an organosol and tested and compared to a coating made with epoxy novolac. The amount of stabilizer used represented a 40% reduction of total oxirane in the final coating composition. The final composition is shown in Table 6.

TABLE 6

Coating composition made with 40% less Stabilizer

| Component | Percent Weight |
| --- | --- |
| Toluene | 21.33 |
| Isophorone | 12.45 |
| MIBK | 9.59 |
| Butyl Cellosolve | 0.01 |
| VMCH | 8.77 |
| Cymel 5010 | 5.82 |
| PVC dispersion | 30.24 |
| SL-404 | 1.17 |
| Aluminum Pigment Paste | 5.07 |
| Citric Acid Stabilizer | 1.91 |
| Carnauba Wax Dispersion | 1.18 |
| N-Butanol | 2.21 |
| Phosphoric Acid 85% | 0.25 |

Coating compositions were evaluated by applying the composition to tin-free steel (TFS) and baking for 20 seconds to a peak metal temperature of 232° C. (AER coil oven; AER Corp.; Ramsey, N.J.). The coating compositions were tested at a dry film weight of 1.2 mgs/cm$^2$ to 1.6 mgs/cm$^2$. Three beaded cans (54 mm×51 mm) were drawn from the the coated steel. These cans were then tested for coating adhesion on the upper sidewall, middle sidewall, and lower sidewall. Additionally, 3 cans, each of which were drawn from substrates individually coated with these formulations, were tested using the food pack protocols outlined above. The results of this testing are summarized in Table 7, including a comparison of the results obtained using Comparative Example 5.

TABLE 7

|  | Example 11 | Comparative Example 5 |
| --- | --- | --- |
| No foodpack |  |  |
| Upper sidewall | 9 | 10 |
| Middle sidewall | 10 | 10 |
| Lower sidewall | 10 | 10 |
| Albacore Tuna in Water |  |  |
| Upper sidewall | 8 | 9 |
| Middle sidewall | 9 | 9 |
| Lower sidewall | 8 | 9 |
| Blush | 9 | 9 |
| Corrosion | 10 | 10 |
| Red Sockeye Salmon in Oil |  |  |
| Upper sidewall | 8 | 9 |
| Middle sidewall | 10 | 10 |
| Lower sidewall | 10 | 10 |
| Surface stain | 10 | 10 |
| Corrosion | 10 | 10 |

A number of embodiments of the invention have been described. Nevertheless, it will be understood that various modifications may be made without departing from the spirit and scope of the invention. Accordingly, other embodiments are within the scope of the following claims.

What is claimed is:

1. A coating composition, comprising:
a thermoplastic dispersion; and
a stabilizer, wherein said stabilizer comprises the reaction product of an epoxy resin and an acid, wherein the ratio of equivalents of epoxy groups in the epoxy resin to acid groups in the acid is at least 2 to 1, and wherein said stabilizer has at least two oxirane functional groups per molecule.

2. The coating composition of claim 1 wherein the composition is completely epoxy-novolac-free.

3. The coating composition of claim 1 wherein the stabilizer has at least 3 oxirane functional groups per molecule.

4. The coating composition of claim 1 wherein the epoxy resin has a number average molecular weight of about 222 to about 1500.

5. The coating composition of claim 1 wherein the epoxy resin has a number average molecular weight of about 300 to about 400.

6. The coating composition of claim 1, wherein the epoxy resin is derived from a compound selected from the group consisting of bisphenol A, bisphenol F, biphenol, and resorcinol.

7. The coating composition of claim 1 wherein the acid is a multi-functional acid.

8. The coating composition of claim 7, wherein the acid is selected from the group consisting of citric acid, adipic acid, trimellitic, benzene tricarboxylic, trimesic, azelaic, and mixtures thereof.

9. The coating composition of claim 1, wherein the thermoplastic material comprises a halogenated polyolefin.

10. The coating composition of claim 1, wherein the thermoplastic dispersion comprises a liquid carrier and the liquid carrier comprises an organic solvent selected from the group consisting of ketones, glycol ethers, alcohol, hydrocarbons, and mixtures thereof.

11. The coating composition of claim 1 wherein the thermoplastic dispersion comprises a liquid carrier, and the liquid carrier comprises a plasticizer.

12. The coating composition of claim 1 wherein the thermoplastic comprises polyvinylchloride, the epoxy resin is derived from bisphenol A, the acid is citric acid, and the thermoplastic dispersion comprises a liquid carrier comprising an organic solvent.

13. The coating composition of claim 1, further comprising at least one additive selected from the group consisting of lubricant, pigment, plasticizer, crosslinker, and flow control agent.

14. A method of making a coating composition, comprising:
providing a thermoplastic dispersion;
providing a stabilizer, wherein said stabilizer comprises the reaction product of an epoxy resin and an acid, wherein the ratio of equivalents of epoxy groups in the epoxy resin to acid groups in the acid is at least 2 to 1, and wherein said stabilizer has at least two oxirane functional groups per molecule; and
admixing the stabilizer and dispersion.

15. The method according to claim 14 further comprising admixing at least one additive selected from the group consisting of lubricant, pigment, plasticizer, crosslinker, and flow control agent.

16. The method according to claim 14 wherein the thermoplastic material comprises thermoplastic particles comprising a halogenated polyolefin.

17. The method according to claim 14 wherein the coating composition is completely epoxy-novolac-free.

18. The method according to claim 14 wherein the wherein the thermoplastic dispersion comprises a liquid carrier, and the liquid carrier comprises an organic solvent selected from the group consisting of ketones, glycol ethers, alcohol, hydrocarbons, and mixtures thereof.

19. The method according to claim 14 wherein the thermoplastic dispersion comprises a liquid carrier, and the liquid carrier comprises a plasticizer.

20. The method according to claim 14 wherein the epoxy resin is derived from a compound selected from the group consisting of bisphenol A, bisphenol F, biphenol, and resorcinol.

21. The method according to claim 14 wherein the compound is bisphenol A.

22. The method according to claim 14 wherein the acid is selected from the group consisting of citric acid, adipic acid, trimellitic, benzene tricarboxylic, trimesic, azelaic, and mixtures thereof.

23. The method according to claim 14 wherein the thermoplastic material comprises polyvinylchloride, the epoxy resin is derived form bisphenol A, the acid is citric acid and the thermoplastic dispersion comprises a liquid carrier comprising an organic solvent.

24. The method according to claim 14 further comprising at least one additive selected from the group consisting of lubricant, pigment, plasticizer, crosslinker, and flow control agent.

25. The method according to claim 14 wherein the stabilizer has at least 3 oxirane functional groups per molecule.

26. The coating composition of claim 1, wherein the acid is at least tri-functional.

27. The method according to claim 14, wherein the acid is at least tri-functional.

28. A coating composition, comprising:
a thermoplastic dispersion; and
a stabilizer, wherein said stabilizer comprises the reaction product of an epoxy resin and an acid, wherein the ratio of equivalents of epoxy groups in the epoxy resin to acid groups in the acid is at least 2 to 1, wherein said acid is at least tri-functional, and wherein said stabilizer has more than two oxirane functional groups per molecule.

29. The coating composition of claim 28, wherein the epoxy resin has a number average molecular weight of about 222 to 1500.

30. The coating composition of claim 28, wherein the epoxy resin has a number average molecular weight of about 300 to about 400.

31. The coating composition of claim 28, wherein the epoxy resin is derived from a compound selected from the group consisting of bisphenol A, bisphenol F, biphenol, and resorcinol.

32. The coating composition of 28, wherein the acid is selected from the group consisting of citric acid, trimellitic, benzene tricarboxylic, trimesic, and mixtures thereof.

33. The coating composition of claim 28, wherein said acid is citric acid.

34. The coating composition of claim 28, wherein the composition is completely epoxy-novolac-free.

35. The coating composition of claim 28, further comprising at least one additive selected from the group consisting of lubricant, pigment, plasticizer, crosslinker, and flow control agent.

36. The coating composition of claim 28, wherein the thermoplastic dispersion comprises a liquid carrier, and the liquid carrier comprises at least one of an organic solvent and a plasticizer.

37. The coating composition of claim 28, wherein the stabilizer has at least 3 oxirane functional groups per molecule.

* * * * *

UNITED STATES PATENT AND TRADEMARK OFFICE
CERTIFICATE OF CORRECTION

PATENT NO.        : 6,924,328 B2
APPLICATION NO.   : 10/224120
DATED             : August 2, 2005
INVENTOR(S)       : Legleiter et al.

It is certified that error appears in the above-identified patent and that said Letters Patent is hereby corrected as shown below:

Title page,
Item [56], References Cited, OTHER PUBLICATIONS, "Dick et al., "Solid State $^{13}$C and In-Sutu $^1$11" should be -- Dick et al., "Solid State $^{13}$C and In- Sutu $^1$H --.

Column 15,
Line 1, "The method according to claim 14 wherein the thermoplastic" should be -- The method according to claim 14 wherein the thermoplastic, --.
Line 21, "resin is derived form" should be -- resin is derived from --.

Signed and Sealed this

Eleventh Day of July, 2006

JON W. DUDAS
*Director of the United States Patent and Trademark Office*